United States Patent

[11] 3,547,292

[72] Inventors Peter Sammarco
Bellwood;
Robert W. Sanderson, III, Lombard, Ill.
[21] Appl. No. 833,457
[22] Filed June 16, 1969
[45] Patented Dec. 15, 1970
[73] Assignee International Harvester Company
Chicago, Ill.
a corporation of Delaware

[54] REVERSIBLE AUGER EXTENSION
7 Claims, 7 Drawing Figs.
[52] U.S. Cl. .................................................. 214/520;
193/5; 198/213, 198/72; 214/83.32, 214/83.26
[51] Int. Cl. ...................................................... B60p 1/40
[50] Field of Search ........................................... 214/519,
520, 521, 522, 83.32, 32.26, 17.8; 198/64, 72,
213, 126, 101; 193/2—8, 15; 37/43A—43L

[56] References Cited
UNITED STATES PATENTS
3,047,174 7/1962 Kasten ........................... 214/520
3,100,052 8/1963 Brembeck ..................... 214/17(.8)

*Primary Examiner*—Albert J. Makay
*Attorney*—Noel G. Artman

ABSTRACT: A reversible discharge trough having each of its ends selectively attachable to an auger type cross conveyor of a self-unloading wagon, the trough having a U-shaped cross section and an articulated driven auger section therewithin, one end of the trough terminating substantially normal to its horizontal axis to effect a substantially horizontal discharge when attached to the wagon, and the other end of the trough terminating at one obtuse angle relative to its longitudinal axis to effect a discharge above the horizontal.

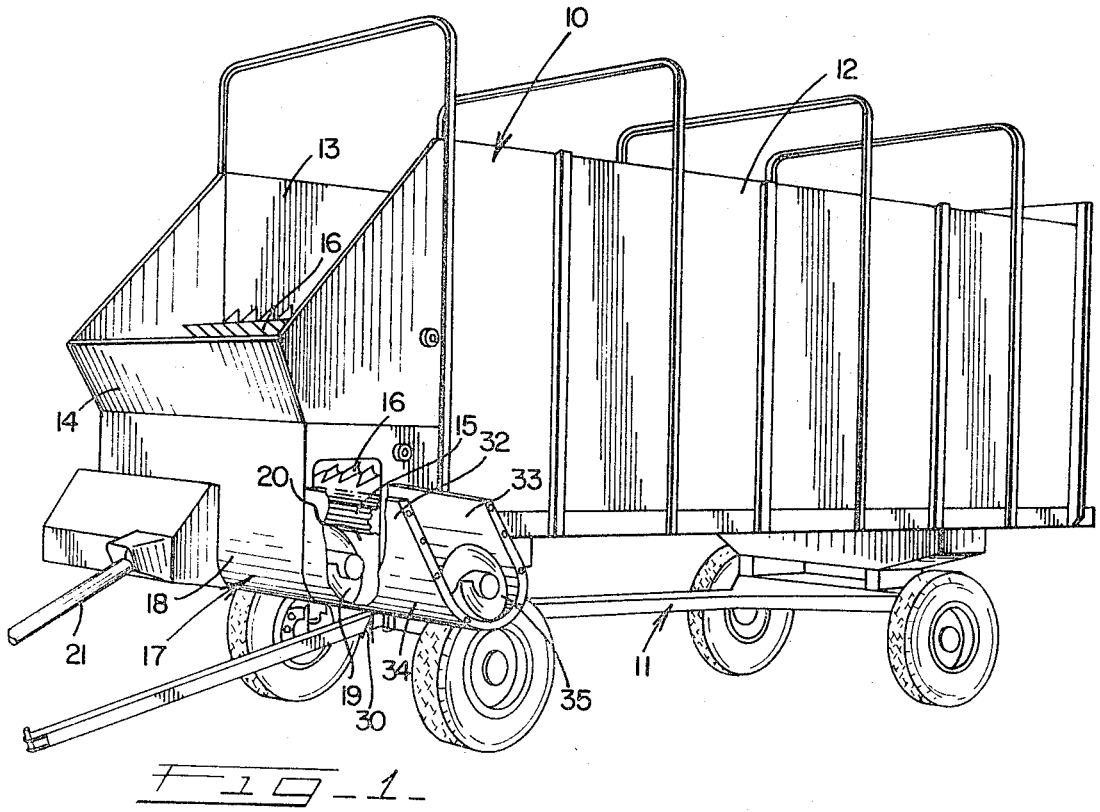

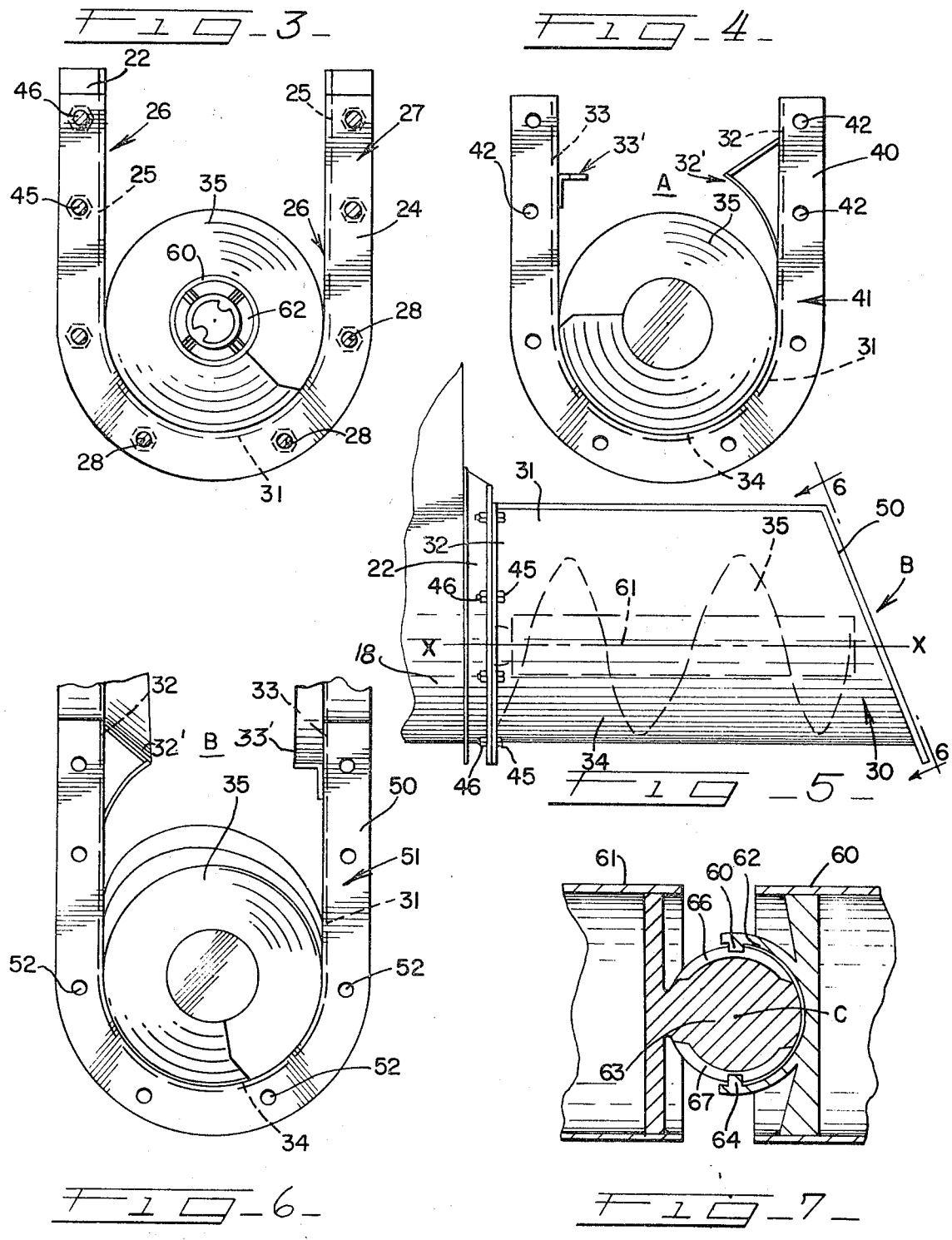

3,547,292

1

REVERSIBLE AUGER EXTENSION

BACKGROUND OF THE INVENTION

The conventional self-unloading wagon, commonly known as a forage box, is a versatile material handling implement adaptable to a number of farming operations requiring the moving and the distributing of crop or other material. Such wagons include a boxlike structure having a material supporting bed mounted on a mobile frame. Arranged along the bed are a number of interconnected driven slats which can move material, deposited thereon, either forwardly or rearwardly of the wagon for eventual discharge from the wagon. Mounted across the front end of the wagon is a powered cross conveyor which receives material fed to it by the moving slats and is operative to discharge the material from the side of the wagon. At times it is desirable that an extension be added to the discharge end of this cross conveyor to ensure discharge of the material at extended distances from the wagon, thereby giving the cross conveyor that longer reach which is necessary in some applications such as bunk feeding or building temporary stack silos. Some operations such as unloading into conveyors or forage blowers require the conveyor extension to be disposed horizontally Other operations, however, it is desirable that the conveyor extension discharge at a height above its normal horizontal discharge height. When the cross conveyor is of the type that uses an auger for discharge it is customary the extension also include a short auger which is connected to and driven by the auger of the cross conveyor within the confines of the extension.

It is also desirable that a discharge conveyor be economical to produce and yet versatile in application. It is also desirable that such an extension be easily attachable to the unloading wagon but yet firmly securable thereto to withstand the vibrations caused by an auger rotating therein.

OBJECTS OF THE INVENTION

A general object of the invention is to provide a self-unloading wagon having a cross conveyor discharge with a novel discharge extension for discharging material at extended distances from the wagon at various elevations.

The more specific object of the invention is to provide a discharge extension having each of its ends selectively connectable to the self-unloading wagon wherein the connection of each end corresponds to a different discharge height.

A still further object of the foregoing is to provide the self-unloading wagon in each end of the discharge extension with uniform attachment means so that either end of the extension is uniformally attachable to the self-unloading wagon.

BRIEF DESCRIPTION OF THE DRAWINGS

FIG. 1 is a perspective view of the self-unloading wagon having a conveyor extension with parts cut away disposed in a substantially horizontal discharge position;

FIG. 2 is a fragmentary elevational view of the conveyor extension disposed in inclined operative position;

FIG. 3 is an elevational view taken substantially at line 3, 3 of FIG. 2;

FIG. 4 is an end view of the trough taken substantially at line 4, 4 of FIG. 2;

FIG. 5 is a fragmentary elevational view of the trough shown in a substantially horizontal discharge position;

FIG. 6 is an end view of the other end of the trough taken substantially at line 6, 6 of FIG. 5; and FIG. 7 is a fragmentary sectional view of the drive connection between the auger sections.

DESCRIPTION OF THE PREFERRED EMBODIMENT

Referring to FIG. 1 there is shown a self-unloading wagon of the agricultural type commonly referred to as a forage wagon. The wagon includes a box 10 which is carried on carriage generally designated 11 which is adapted to be pulled and powered by a farm tractor (not shown). The box includes side walls 12 and 13 and a front end wall 14. A bed chain conveyor of conventional type is shown at 15 and is adapted to move a load of material, such as silage, forwardly within the box 10. A plurality of beaters 16 are superposed with respect to each other and disposed across the forward end of the box for intercepting and loosening packed material during unloading operations.

A cross conveyor generally designated 17 is arranged across the forward end of the wagon in material receiving relation to the bed conveyor 15. The cross conveyor comprises a U-shaped trough 18 disposed below and adjacent to the bed conveyor 15 and in material receiving relation thereto. A driven auger 19 is carried within the trough 18 for delivering material received thereby and discharging the same through an opening 20 in the sidewall 12 of the box 10. The bed conveyor 15, the beaters 16 and the auger 18 of the cross conveyor are driven by a power train (not shown) which is powered by a drive shaft 21 which is connectable to an external power source such as a conventional power takeoff unit found on farm tractors.

Attention is directed to FIGS. 2 and 3 which show a mounting channel 22 having inner and outer flanges designated 23 and 24 respectively and interconnected by an interposed web 25 which also provides an inner wall surface 26 aligned with the cross conveyor trough 18. The web 25 has a U-shaped configuration and is securely mounted on the wall 12 by rivets, or the like, in a location adjacent to each side, and the lower portion of the opening 20 to also serve as a short extension of the trough 18 of the cross conveyor 17. The outer flange 24 has an outwardly facing planar surface 27 and uniformly spaced holes 28 therethrough arranged along that surface, as best seen in FIG. 3.

In accordance with the invention a conveyor extension unit, generally designated 30 is shown in FIG. 2, mounted on channel 22 in one position for discharging material from the wagon an elevation above the horizontal. The unit comprises a trough portion 31 having a U-shaped cross section with upright sidewalls 32 and 33 respectively interconnected by an arcuate bottom wall 34, as seen in FIG. 1. An auger assembly 35 is carried within these wall portions and is rotatable about a principal axis designated by the line X-X which is also symmetrically disposed from each of the walls 32, 33 and 34.

As shown in FIGS. 2 and 4 one end designated A of the extension trough 31 has a flanged end member generally designated 40 which extends outwardly from the termination of the walls (32, 33, 34) of the trough 31 at that end. It can be seen that this end has been terminated on the square with respect to the longitudinal extent of the trough to effect a substantially horizontal attitude of discharge when this end is mounted on channel 22. This position is shown in FIG. 5. In accordance with the squared termination the flanged end member 40 has an outwardly facing surface 41 which lies in a plane substantially normal to the line X-X at all angles of intersection. As best seen in FIG. 4 a plurality of holes 42 have been placed through the member 40 and spaced along the surface in such a manner to register with the holes 28 of the mounting channel 22 when the outwardly facing surfaces 27 and 41 of the mounting channel and trough end respectively are abutted to each other with the inner wall surface 26 of the channel 22 being in substantial alignment with the inwardly facing surfaces of the extension trough walls 32, 33 and 34. Bolts 45 and nuts 46 are used to securely fasten the extension trough 31 to channel 22 in this substantially horizontal position.

When it is desired that material be discharged from the wagon at an elevation above the horizontal the trough 31 can be mounted on the channel 22 in the position shown in FIG. 2. As best seen in FIGS. 5 and 6 the other end of the trough 31 has been designated B and also has a flanged end member 50 which extends outwardly from the termination of the walls 32, 33 and 34 at that end. The flanged member 50 has an outwardly facing mounting surface 51 which lies in a plane having an orientation transverse to the line X-X. A plurality of holes 52 are placed through the flange and arranged to register with the hole 28 of the channel 22 when the end B is positioned as shown in FIG. 2. Here again the bolts 45 and nuts 46 are used to firmly secure the trough 31 in that position.

As hereinbefore mentioned the conveyor extension unit 30 includes an auger 35 carried by the trough 31 and being approximately coextensive to the length thereof. The auger 35 is adapted to be drivingly coupled to the cross conveyor auger 19 by a universal joint connection which will drive the auger 35 in each selected position of the trough 31. Each of the augers 19 and 35 include core members 60 and 61 respectively on which their flights are mounted. As shown in FIG. 7 a socket member 62 is secured to the core 60 and a ball member 63 having a center C is secured to one end of the core 61 of the auger 35. The socket member 62 includes a pair of diametrically disposed lugs 64 and 65. The ball member 63 has a pair of diametrically spaced longitudinally arranged grooves 66 and 67 which are disposed to receive the lugs 64 and 65 when the ball is positioned inside the socket. It can be seen that the lugs approximately align with the center C of the socket member 63 when the auger 35 is in driving engagement with the auger 19 of the cross conveyor. Accordingly it will be seen that a driving connection to the auger 35 is maintained in each position selected as the trough 31 is mounted in the various discharge attitudes hereinbefore described.

This simplified connection of the two augers permits them to be separated by simply shifting the auger 35 away from the auger 19. During operation, however, in conveying material from the wagon the reactive force of the material on the flights of the auger 35 produce a reactive force which acts to maintain the ball and socket members of the connection in coupled relation to each other. It should also be noted that the auger is retained within the trough 31 by elements 32' and 33' secured to the walls 32 and 33 respectively in a position parallel and coextensive with the auger 35.

It will be apparent from the foregoing that the angular orientation of termination of each end of the trough 31 and the corresponding orientation of the respective flanges thereat could be arranged at an almost infinite variety of positions to effect a corresponding multiplicity of attitudes of discharge, thus troughs can be made to suit almost any condition dictated by the gamut of farming operations which can be easily secured and reversibly fastened to a self-unloading wagon at a desired attitude of discharge.

We claim:

1. In a self-unloading wagon having a material receiving box mounted thereon, a bed conveyor disposed within said box for moving material to either end thereof, a cross conveyor extending transversely of the box in material receiving relation to said bed conveyor and discharging material through an opening in the side of the box, the improvement comprising, a fixed mounting element disposed on the box adjacent the discharge opening, a removable extension conveyor trough reversibly connectable end for end on said fixed element in receiving relation to said opening to convey and discharge material from the cross conveyor, one end of said trough having a mounting surface adapted for connection to said fixed element to effect a discharge therefrom at a first elevational position, the other end of the trough having another mounting surface adapted for connection to said fixed element to effect a discharge therefrom at a second elevational position above said first position, means for selectively connecting the respective mounting surfaces of each end of the trough to said fixed element, and conveying means carried by said trough to convey and discharge material from the trough in both the first and second positions.

2. The invention according to claim 1 and said conveying means carried by said trough including means at one end thereof for connection to the cross conveyor to effect a drive to power the conveying means in each of the first and second positions.

3. The invention according to claim 1 and each end of the trough being defined by an end edge thereof and each mounting surface and respective end edge having a relative orientation so that at all points they lie substantially in a transverse plane defining the termination of that end of said trough, and said fixed mounting element of the box having an outwardly facing mounting surface with respect to said box wherein each mounting surface of said trough is adapted to mate with the mounting surface of the fixed element for mounting of the trough thereon in both the first and second positions.

4. The invention according to claim 3 and said fixed element comprising a channel having inner and outer flanges interconnected by an interposed web, said inner flange abutting and fixed to said box, and said outer flange providing said fixed mounting surface facing outwardly from said box and lying in a plane having a substantially vertical orientation.

5. The invention according to claim 4 and said channel with said outwardly facing mounting surface having a U-shaped configuration correspondingly disposed about the discharge opening of the cross conveyor and said extension trough having a substantially similar uniform U-shaped cross section with said mounting surface at each end thereof correspondingly shaped to mate with the mounting surface of said channel, said cross conveyor including a driven auger terminating at said discharge opening, and said conveying means carried by said trough comprising another auger having a universal joint on one end thereof which is attachable to the end of said driven auger of the cross conveyor to be driven thereby for conveying and discharging material from the trough in both the first and second position.

6. In a self-unloading wagon having a material receiving box mounted thereon, a bed conveyor disposed within the box for moving material longitudinally thereof, a cross conveyor having an auger disposed on one end of the box in material receiving to said bed conveyor, said auger conveyor operative to discharge material through an opening in the side of said box, the improvement comprising a fixed mounting surface disposed on the box adjacent said opening, a removable discharge conveyor trough reversibly mountable end for end in an upright first and second position in material receiving relation to said opening for conveying material and discharging the same from the wagon, each end of the trough having mounting surfaces which respectively register with the fixed mounting surface of the wagon in the first and second position, one end mounting surface of the trough being oriented with respect thereof to effect the first position, and the other end mounting surface of the trough being oriented with respect thereof to effect the second position having a higher discharge height than said first position, means for selectively mounting the trough in each position, an extension auger carried within the trough and having means for connecting to the auger of the cross conveyor in each position.

7. In an extension assembly for a conveyor structure having a mounting face embracing a material discharge opening, and auger drive means contiguous with said opening; the combination of an auger channel having opposite open ends with respective mounting faces alternately assembleable with the conveyor structure mounting face, said auger channel mounting faces being disposed at different angles transversely of the channel to dispose the channel at respectively different angle attitudes relatively to the conveyor structure when assembled with the conveyor structure mounting face; and auger means drivingly connected with said auger drive means and extending into said channel while in each of said attitudes.